(12) United States Patent
de Sylva

(10) Patent No.: US 6,368,497 B1
(45) Date of Patent: *Apr. 9, 2002

(54) COMPACT MOBILE OIL RECYCLING SYSTEM

(76) Inventor: Robert F. de Sylva, 161 Ocean Park Blvd., #D, Santa Monica, CA (US) 90405

( * ) Notice: Subject to any disclaimer, the term of this patent is extended or adjusted under 35 U.S.C. 154(b) by 0 days.

This patent is subject to a terminal disclaimer.

(21) Appl. No.: 08/826,727

(22) Filed: Apr. 7, 1997

(51) Int. Cl.[7] ............................................. B01D 35/01
(52) U.S. Cl. ..................... 210/120; 210/136; 210/304; 210/418; 210/436; 210/440; 210/512.1; 210/457; 210/472
(58) Field of Search .................. 210/180, 304, 210/436, 440, 441, 457, 512.1, 120, 456, 136, 418, 472; 196/46, 46.1, 110, 128; 123/196 A

(56) References Cited

U.S. PATENT DOCUMENTS

| | | | | |
|---|---|---|---|---|
| 2,133,359 A | * | 10/1938 | Miller | 196/128 |
| 2,173,631 A | * | 9/1939 | Niedens | 210/120 |
| 2,392,901 A | * | 1/1946 | Brown | 210/436 |
| 2,428,939 A | * | 10/1947 | Morris | 210/80 |
| 2,983,384 A | * | 5/1961 | Winslow | 210/304 |
| 3,334,752 A | * | 8/1967 | Matravers | 210/497.1 |
| 4,151,823 A | * | 5/1979 | Grosse et al. | 123/196 A |
| 4,227,969 A | * | 10/1980 | Engel | 196/115 |
| 4,337,119 A | * | 6/1982 | Donahue | 196/46.1 |
| 4,943,452 A | * | 7/1990 | Lefebvre et al. | 196/46.1 |
| 5,322,596 A | * | 6/1994 | Arntz | 196/46.1 |
| 5,569,373 A | * | 10/1996 | Smith et al. | 210/304 |
| 5,776,315 A | * | 7/1998 | Lowry | 196/46.1 |
| 5,824,211 A | * | 10/1998 | Lowry | 210/440 |

* cited by examiner

Primary Examiner—Matthew O. Savage

(57) ABSTRACT

A mobile oil recycling system adapted for use with an oil-lubricated combustion engine. The inventive system includes an evaporation chamber for changing the pressure of the oil from a first pressure to a second pressure lower than the first pressure. Metering holes in a textured three-dimensional evaporation surface at the second pressure allow oil to spread over the three-dimensional surface area and evaporate contaminants from the oil. In a specific embodiment, the system further includes a filtering system for removing solid contaminants from the oil. A housing contains and supports the filtering system and the contaminant removal chamber, and directs the flow of oil through the recycling system. In a more specific embodiment the housing includes a base having an oil inlet for allowing pressurized oil to enter the oil recycling system and an oil outlet for allowing oil at atmospheric pressure to exit the recycling system. The three-dimensional evaporation surface has channels or grooves therein and is located in the liquid and gas contaminant removal chamber. A vent in the housing allows vaporized contaminants to escape from the chamber. The unique three-dimensional surface of the present invention obviates the need for an electric heater element, and eliminates wasted space and excess weight inherent in systems that have evaporation units stacked on filters.

3 Claims, 4 Drawing Sheets

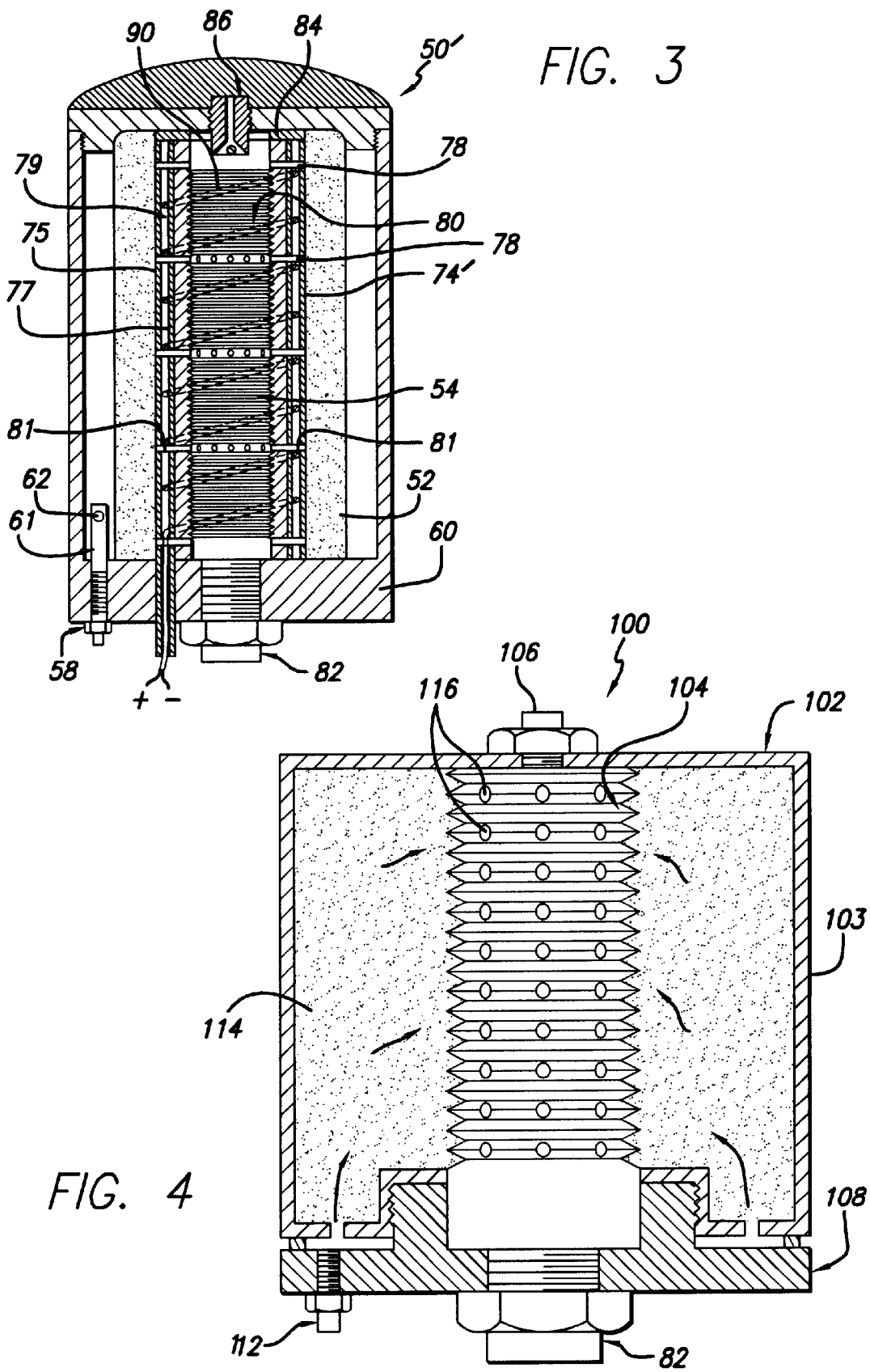

COMPACT MOBILE OIL RECYCLING SYSTEM

BACKGROUND OF THE INVENTION

1. Field of Invention

This invention relates to oil recycling devices. Specifically, the present invention relates to devices for maintaining clean engine oil while an engine is operating.

2. Description of the Related Art

Oil is a lubricant in a variety of applications ranging from electric generators to printing presses to automobiles. Such applications require clean oil with minimal liquid, gas, and solid contaminants.

Typical engine oil contains a variety of solid, gas, and liquid contaminants. Engine oil is contaminated by gases from engine cylinder blow-by; by solids from engine component wear, and by liquids from coolant leaks and condensed blow-by gasses. Liquids combine with sulfur and other compounds from cylinder blow-by, creating corrosive acids, such as sulfuric acid. These contaminants corrode engine parts and deplete special minerals and detergents added to help maintain important oil properties including lubricity and viscosity.

To reduce problems associated with oil contamination, full-flow filters were developed. All oil circulating around an engine equipped with a full flow filter is directed through the filter or filter housing. High flow requirements limit the ability of conventional full flow filters to remove very small solid contaminants. Large particles of twenty microns or larger often pass through such filters and contribute to engine wear. In addition, conventional full flow filters are ineffective at removing liquid contaminants from the oil.

To remove both solid and liquid contaminants from engine oil, mobile, i.e., onboard oil refining systems were developed. The systems continually remove, clean, and replace small amounts of oil from the engine as the engine operates. The systems include a special evaporation compartment that attaches to a by-pass filter. The evaporation compartment removes both gas and liquid contaminants from the oil, and the filter removes solid contaminants as small as one micron in diameter. Such small particles are often smaller than engine tolerances and do not contribute to engine wear. These oil refining systems may obviate the need for interval oil changes but require interval filter changes.

The systems require a large evaporation compartment and an expensive electric heating element. The heating element increases the risk of the systems exploding due to gas ignition. To reduce explosion danger, the evaporation compartments are constructed of strong, thick, and heavy metal. Also, the heating element eliminates a beneficial oil cooling effect that would otherwise occur.

The large size of the systems limits installation to large trucks and automobiles with ample space. Installation on most modern automobiles is difficult and expensive due to limited space. In addition, electrical connections required for the electric heating elements complicate installation, and decrease the reliability of the systems. Public acceptance of the systems has been minimal as a result of these problems.

Hence, a need exists in the art for a safe, space-efficient and cost-effective mobile oil recycling system that removes both solid and liquid contaminants from oil. There is a further need for a system that may be easily installed on modern automobiles.

SUMMARY OF THE INVENTION

The need in the art is addressed by mobile oil recycling system of the present invention. In the illustrative embodiment, the inventive system is adapted for use with a combustion engine and includes an evaporation chamber for changing the pressure of the engine oil from a first pressure to a second pressure lower than the first pressure. Metering holes in a textured three-dimensional evaporation surface at the second pressure allow oil to spread over the three-dimensional surface area and evaporate contaminants from the oil. This evaporation process has a desirable oil cooling effect.

In a specific embodiment, the system includes a filtering system for removing solid contaminants from the oil. A housing contains and supports the filtering system and the evaporation chamber, and directs the flow of oil through the system. The housing includes a base having an oil inlet for allowing pressurized oil to enter the oil recycling system and an oil outlet for allowing oil at atmospheric pressure to exit the recycling system. An evaporation surface in the liquid and gas contaminant removal chamber facilitates the removal of gas and liquid contaminants from the oil. A vent in the housing allows vaporized contaminants to escape.

The housing includes a first wall and a second wall. The inside surface of the first wall is the evaporation surface and is textured for maximizing evaporation surface area. The filtering system includes a space between the first wall and the second wall. Oil enters the space via the oil inlet in the base of the housing. The filtering system includes a jet on the oil inlet for creating a centrifugal flow in the space that forces large particles out of circulation.

In the illustrative embodiment, the housing includes a spin-on filter canister. The filtering system includes a gradient density low-micron filter that removes solid contaminants and helps absorb and neutralize liquid contaminants. The filter is located between the space and the first wall. Strategically located holes in the first wall allow oil to pass through the filter and onto the evaporation surface. The first wall and the second wall are concentric tubular walls, capped at one end by the base of the housing, and at the other end by an end cap.

The novel design of the present invention is facilitated by grooves or channels in the evaporation surface that increase the rate of evaporation of contaminants from oil on the surface, thereby obviating the need for an electric heater element. This texturing of the surface to create a three-dimensional surface eliminates wasted space and excess weight inherent in systems that have evaporation units and heater elements stacked on filters.

BRIEF DESCRIPTION OF THE DRAWINGS

FIG. 3 is a cross-sectional view of the recycling system of the present invention including an evaporation heater.

FIG. 4 is a cross-sectional view of a first alternative embodiment of the present invention including a spin-on filter.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of the operation of a conventional mobile oil recycling system is intended to facilitate an understanding of the present invention.

Figure 1:
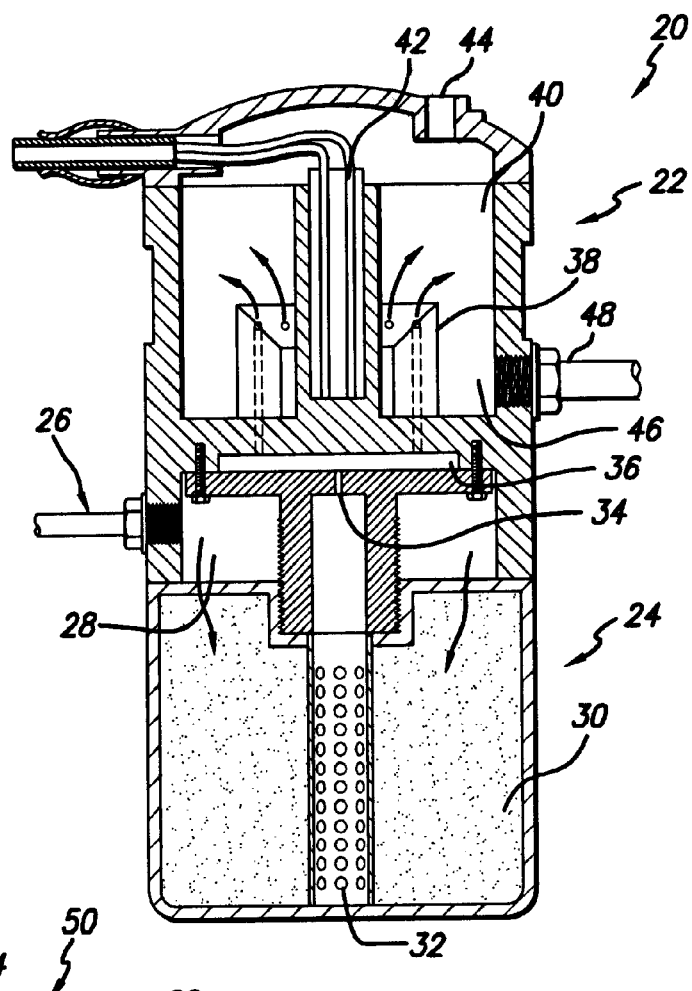
FIG. 1 is a cross-sectional view of a conventional mobile oil recycling system.

FIG. 1 is a cross-sectional view of a conventional mobile oil recycling system 20. The conventional system 20 includes an evaporation unit 22 and a filter 24. Oil enters the refining system 20 via an oil inlet 26 screwed into the side of the evaporation unit 22. The oil inlet 26 carries pressurized oil from an engine (not shown) and deposits the oil in a first hollow space 28 between the filter 24 and the evaporation unit 22. The oil then flows through a filter element 30 that removes solid contaminants down to one micron in size.

After solid contaminants are removed from the oil via the filter 30, the oil passes into a second hollow space 32. Then, the pressurized oil passes through a metering orifice 34 where the oil pressure changes to atmospheric pressure from engine pressure. The metering orifice 34 serves to restrict the flow of the pressurized oil. Oil passing through the orifice 34 enters a third hollow space 36. From the third hollow space 36, the oil flows through oil channels (shown in phantom) into an evaporation compartment 40. Then, the oil flows across a small, flat evaporation surface 38 in the evaporation compartment 40. The evaporation surface 38 is heated by an electric heating element 42. The heating element 42 is powered by electricity from an engine alternator, or a battery.

The oil disperses into a film over the heated surface 38, which facilitates the evaporation of gas and liquid contaminants from the oil. Evaporated gases and liquids are vented via a vent 44. The vent 44 is typically connected to an engine air intake (not shown) allowing contaminant gases and liquid vapors to be re-burnt in the engine.

Oil coagulates at the bottom of the evaporation compartment 40. Gravity then pulls the oil back to the engine via a gravity feed oil return 48. Because the oil return 48 exits the side of the system 20 and not the bottom, oil coagulates at a bottom 46 of the evaporation compartment 40. This coagulation minimizes the effective surface area of the heated surface 38, and increases the susceptibility of the compartment 50 backing up with oil and overflowing out the vent 44.

The first hollow space 28, the second hollow space 32, and the third hollow space 36 all illustrate an inefficient use of space. The large metallic evaporation unit 22 is both heavy and bulky, which complicates installation and increases the cost of the system 20. The system 20 must be mounted using very sturdy metal brackets and screws, which are expensive, bulky, and require a near flat mounting surface, which is difficult to find under the hoods of modern automobiles. In addition, the heating element 42 is an expensive, often unreliable and dangerous component. Also, the evaporation surface 38 is small and does not extend to the top of the compartment 40. As a result, the surface 38 is inefficient and illustrates additional wasted space in the compartment 40.

In a similar oil recycling system (not shown) the oil inlet 26 is placed in the bottom of the filter 24, and the second hollow space 32 is replaced by filter element. In this system, dirty oil in the filter 24 flows back to the engine causing unwanted fluctuations in oil pressure and oil levels in addition to re-contaminating the engine oil. This decreases the efficiency of such systems.

Figure 2:
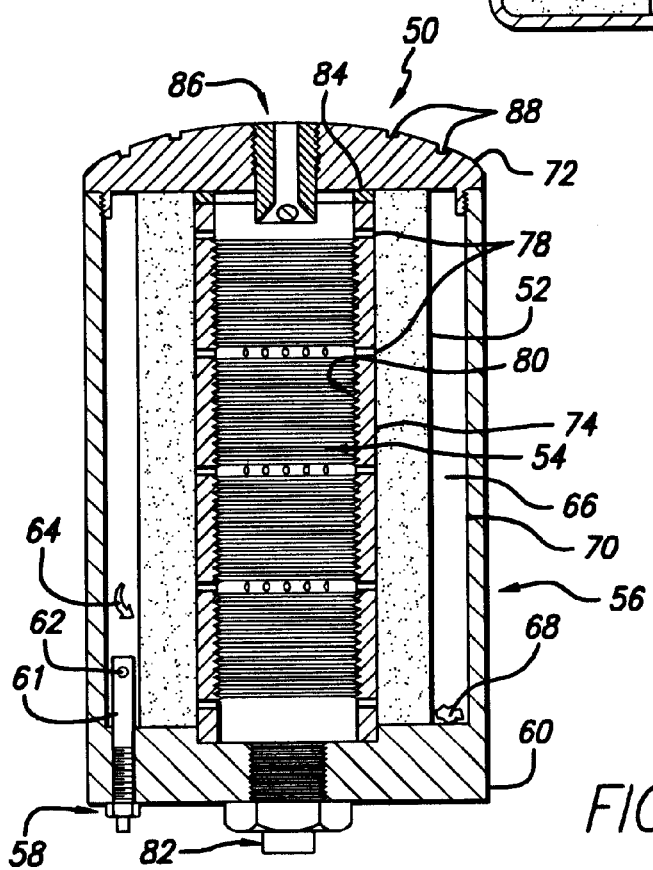
FIG. 2 is cross-sectional view of a mobile oil recycling system constructed in accordance with the teachings of the present invention.

FIG. 2 is cross-sectional view of a mobile oil recycling system 50 constructed in accordance with the teachings of the present invention. The system 50 includes a cylindrical liquid and gas removal chamber 54 surrounded by a low-micron, gradient-density filter 52 that is contained in a system housing 56. The filter 52 may be ordered from a filter supply house, such as Harrington Industrial Plastics. The bulky evaporation unit (see 22 of FIG. 1) of conventional mobile oil recycling systems is replaced by the liquid and gas removal chamber 54 corresponding to the second hollow space (see 32 of FIG. 1). The removal of gas and liquid contaminants by the system 50 is based on surface area and pressure gradients rather than electrical heating. It is widely known that the rate of evaporation of a liquid is proportional to the surface area of the liquid. By expanding the surface area of a liquid, the rate of evaporation of the liquid will increase correspondingly.

In the present specific embodiment, the system 50 is adapted for use with high-grade synthetic oil that is resistant to breakdown. The synthetic oil enters the system 50 via an oil inlet 58 in a base 60 of the system housing 56. The inlet 58 includes a hollow tube 61 having an inlet orifice 62. Pressurized oil entering the system 50 via the inlet 58 passes through the tube 61 and out the orifice 62. The inlet orifice 62 shoots pressurized oil into a high velocity stream (not shown) tangent to the surface of the filter 52. The high velocity stream creates an oil circulation 64 in a centrifuge chamber 66 between the filter 52 and the system housing 56. The circulation 64 results in a centrifugal force that causes large particles 68 to flow to an outside wall 70 of the housing 56 and subsequently fall to the base 60 of the housing 56. This increases the life of the filter 52 and the time between filter changes.

Those skilled in the art will appreciate that the metering orifice 62 may be omitted without departing from the scope of the present invention. The tube 61 may be extended, and the metering orifice 62 may be elevated. In addition, a pre-filter may be attached to the oil inlet 58. Also, the inlet 58 may be located in another part of the housing 56 such as in the wall 70 or in the cap 72.

Oil in the chamber 66 is held at engine pressure in part by a cap 72 that screws on to the system housing 56. Oil flows from the centrifugal chamber 66 through the filter 52 and toward a cylindrical filter support wall 74 that has holes 78. The filter support wall 74 is a tube that is screwed into the base 60. Those skilled in the art will appreciate that the support wall 74 may be a part of the housing 56 or base 60 without departing from the scope of the present invention. In addition, the chamber 66 may be at approximately atmospheric pressure without departing from the scope of the present invention.

Oil passing through the filter 52 enters the contaminant removal chamber 54 via the holes 78. The oil is released from a first pressure, such as approximately engine pressure, to atmospheric pressure as it passes through the holes 78. The contaminant removal chamber 54 is at atmospheric pressure. Clean oil flows out of the chamber 54 and back to the engine via an oil outlet 82. Gravity pulls oil out of the chamber 54 and back to the engine or engine oil pan. The holes 78 are drilled sufficiently small so that the rate of oil entering the chamber 54 and the rate of oil exiting the chamber 54 equalize, preventing the chamber 54 from filling up with oil. By locating the gravity return 82 at the bottom of the system 50, oil circulation through the system 50 is enhanced.

A special evaporation surface 80 exists on the inside of the support wall 74. The surface 80 is ridged and textured to maximize the surface area of the surface 80. The surface area of the surface 80 is orders of magnitude larger than the corresponding evaporation surface area (shown in FIG. 1 as 38) of conventional mobile recycling devices. The extra size of the evaporation surface 80 obviates the need for an electric heater element. Heat from the operating environment of the engine is sufficient to allow the evaporation of contaminant liquids and the removal of contaminant gases from the oil via the evaporation surface 80. The textured evaporation surface 80 allows the system 50 to be installed on automobiles at a near horizontal angle, since channeling, which would limit the effective surface area, is limited by the textured surface. A screen, mesh, or other device may be fitted over the surface 80 for further increasing the effective evaporation surface area of the contaminant removal chamber 54. Hence, the lightweight, space-efficient system 50 may be easily strapped to engine components at a variety of angles, making installation easy and cost-effective.

The end cap 72 is screwed onto the housing 56. The end cap 72 is sealed against the top surface of the wall 74 via a washer 84, closing off the contaminant removal chamber 54. The cap 72 also contains grooves 88 for facilitating gripping of the cap 72. The contaminant removal chamber 54 includes a vent 86 for venting vaporized liquid contaminants from the chamber 54. In the present specific embodiment, the vent 86 includes a check valve to prevent oil from exiting the chamber 54 in case of an oil flow imbalance. The vent 86 is directed to an air intake (not shown).

In the present specific embodiment the filter 52 is a high-quality one-micron gradient-density filter that may be ordered from a filter supply house. The varying density of the filter 52 provides for a more uniform dirt distribution, greatly extending the life of the filter 52.

When installing the system 50, the oil inlet 58 is connected to an engine pressure tap, such as an oil pressure sending unit. The oil outlet 82 is connected to an oil pan or valve cover operating at or near atmospheric pressure. Those skilled in the art will appreciate that check valves and flow control valves may be stalled on the oil inlet 58 and the oil outlet 82 to further control the flow of oil to and from the system 50. In addition, a sleeve made of rubber or some other insulator may be fitted over the housing 56 to reduce heat loss from the system 50.

In the present embodiment, the housing 56, the end cap 72, and the filter supporting wall 74 are constructed of a lightweight metal alloy, and may be manufactured at a conventional machine shop. All materials are heat-resistant and corrosion-resistant.

Unlike the system 20 of FIG. 1, which has an undesirable oil heating effect, the system 50 has a desirable oil cooling effect. The oil sweats out liquid contaminants in the chamber 54. This has an oil cooling effect as contaminant molecules having high kinetic energies evaporate. This lowers the average kinetic energy of molecules in the oil and thus the temperature of the oil.

FIG. 3 is a cross-sectional view of a recycling system 50' constructed in accordance with the present invention. An electric heating coil 90 is embedded in a wall 74'. The embedding may be performed at a conventional machine shop. The wall 74' includes a first cylindrical wall 75 and a concentric second cylindrical wall 77 having a smaller radius than the first wall 75. The coil 90 is rapped around the second cylindrical wall 77. The first wall 75 is placed adjacent to the second wall 77, forming a coil space 79 where the coil 90 resides. The coil 90 has a conventional protective sleeve (not shown) that prevents oil from contacting the coil 90 itself. The holes 78 are fitted with conventional oil resistant sleeves 81 to prevent oil from entering the coil space 79. The concentric walls 75, 77 are sealed at the top by the ring washer 84.

The coil 90 has a resistivity and voltage differential sufficient to heat the chamber 54 to 195 degrees Fahrenheit and may be powered by an engine alternator (not shown), battery (not shown), or other means. The heat from the coil 90 facilitates contaminant evaporation from the surface 80 when oil from the oil inlet 58 is not sufficiently hot to separate liquid and gas contaminants from the oil on the surface 80.

The coil 90 acts as an electromagnet in accordance with Faraday's Law of Electromagnetic Induction. The magnetic field acts to remove any remaining metallic particles from the oil.

Those skilled in the art will appreciate that the coil space 79 may be filled with an oil resistant epoxy after the coil 90 is wrapped around the second wall and before the holes 78 are drilled. This obviates the need for the protective coil sleeve (not shown) and the oil resistant sleeves 81. In addition, the coil 90 may be replaced by a different type of heater; the coil 90 may extend partially up the wall 78; or a pre-heater may be attached to the inlet 58, without departing from the scope of the present invention. Also, a permanent magnet may be used in place of the coil 90 to achieve magnetic filtration.

FIG. 4 is a cross-sectional view of an alternative embodiment 100 of the present invention including a spin-on filter 102 having a spin-on filter canister 103. The filter 102 is a filter of conventional design with the exception that the filter 102 includes a special interior surface 104 and a vapor vent 106.

The filter 102 is screwed onto a base plate 108 that includes an oil outlet 82 and an oil inlet 112. Pressurized oil from an engine (not shown) enters the filter 102 through a base plate 108. Oil passes through a filtering element 114 included in the filter 102, where solid contaminants are removed, and some liquid contaminants are absorbed and/or neutralized. The pressurized oil, free of solid contaminants, is released to atmospheric pressure as it passes through the special surface 104 via small holes 116. The holes 116 are drilled sufficiently small to prevent oil from backing up inside the filter 102. This change in pressure facilitates vaporization of liquid contaminants and the separation and removal of gas contaminants from the oil. The special surface 104 is grooved and roughened for facilitating the dispersion of oil across the surface 104. Oil disperses into a thin film across the surface 104, where the oil that has been heated by the engine releases any liquid or gas contaminants. The oil then flows out of the alternative embodiment 100 via the oil outlet 82 in the base plate 108.

Figure 5:
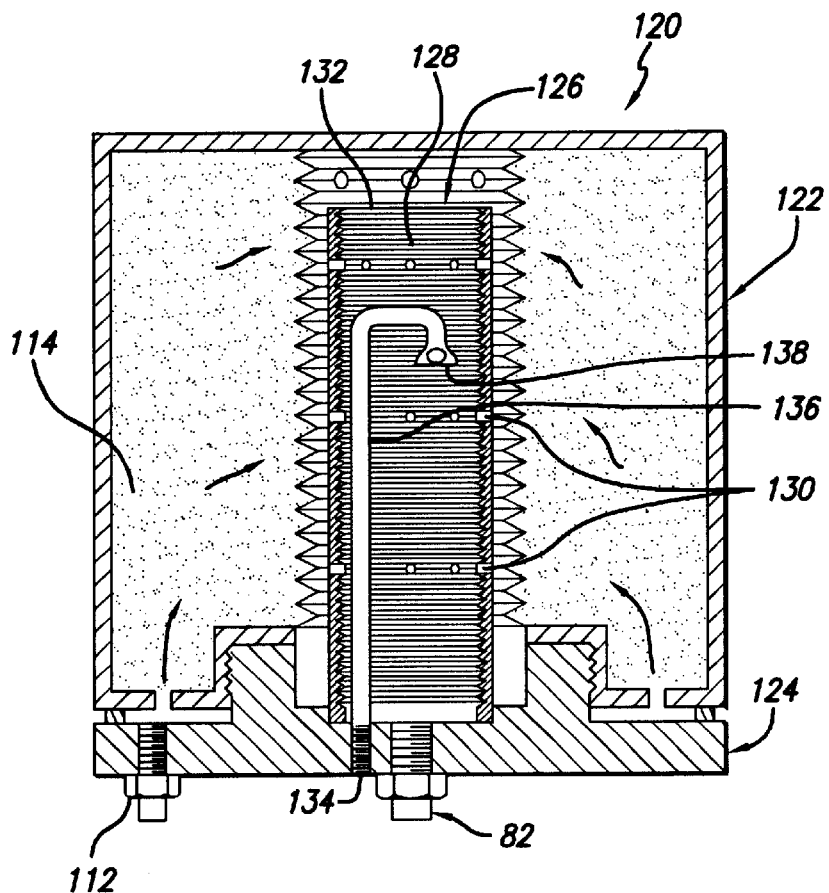
FIG. 5 is a cross-sectional view of an illustrative embodiment of the present invention.

FIG. 5 is a cross-sectional view of an illustrative embodiment 120 of the present invention adapted for use with a conventional spin-on filter 122. The illustrative embodiment 120 includes a plate 124 and an evaporation attachment 126. The attachment 126 is a tube having a textured inside surface 128 with holes 130 and is screwed into the plate 124. Oil cleaned by the filter 102 may flow through the holes 130 and over a top 132 of the evaporation attachment 126. Those skilled in the art will appreciate that oil flow may be prevented from flowing over the top 132 without departing from the scope of the present invention.

The operation of the illustrative embodiment 120 is analogous to the operation of the alternative embodiment of FIG. 4 with the exception that vapors vaporized from the surface 128 may exit through the plate 124 instead of the top of the filter 120. The plate 124 has a vapor outlet 134. A vapor tube 136 extends from the vapor outlet 134 and opens into the evaporation attachment 126. In the present embodiment, the vapor tube 136 includes a ball valve 138 to prevent oil from escaping out the vapor outlet 134 via the vapor tube 136.

Figure 6:
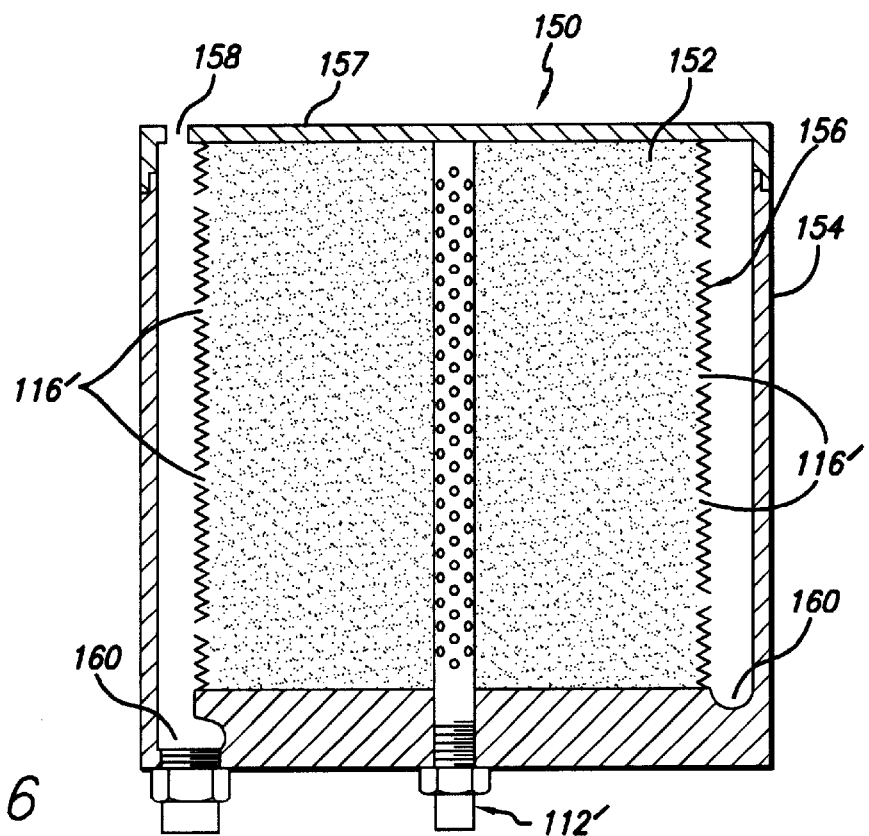
FIG. 6 is a cross-sectional view of a second alternative embodiment of the present invention.

FIG. 6 is a cross-sectional view of a second alternative embodiment 150 of the present invention. The system 150 includes a filter 152 surrounded by an expanded evaporation surface 156.

Heated, pressurized oil enters the system 50 via an oil inlet 112'. Oil flows through the filter 152 and onto the evaporation surface 156 via the small holes 116'. Oil passing through the holes 116' is released to atmospheric pressure, facilitating the vaporization of contaminants from the oil on the surface 156. Vapors are vented through a vent hole 158 in a cap 157 and clean oil drains back to the engine (not shown) via an oil outlet 82.

A groove 160 varies in depth around the circumference of the system 50, helping to direct oil to the oil outlet 82, and preventing oil coagulation in the groove 160.

Figure 7:
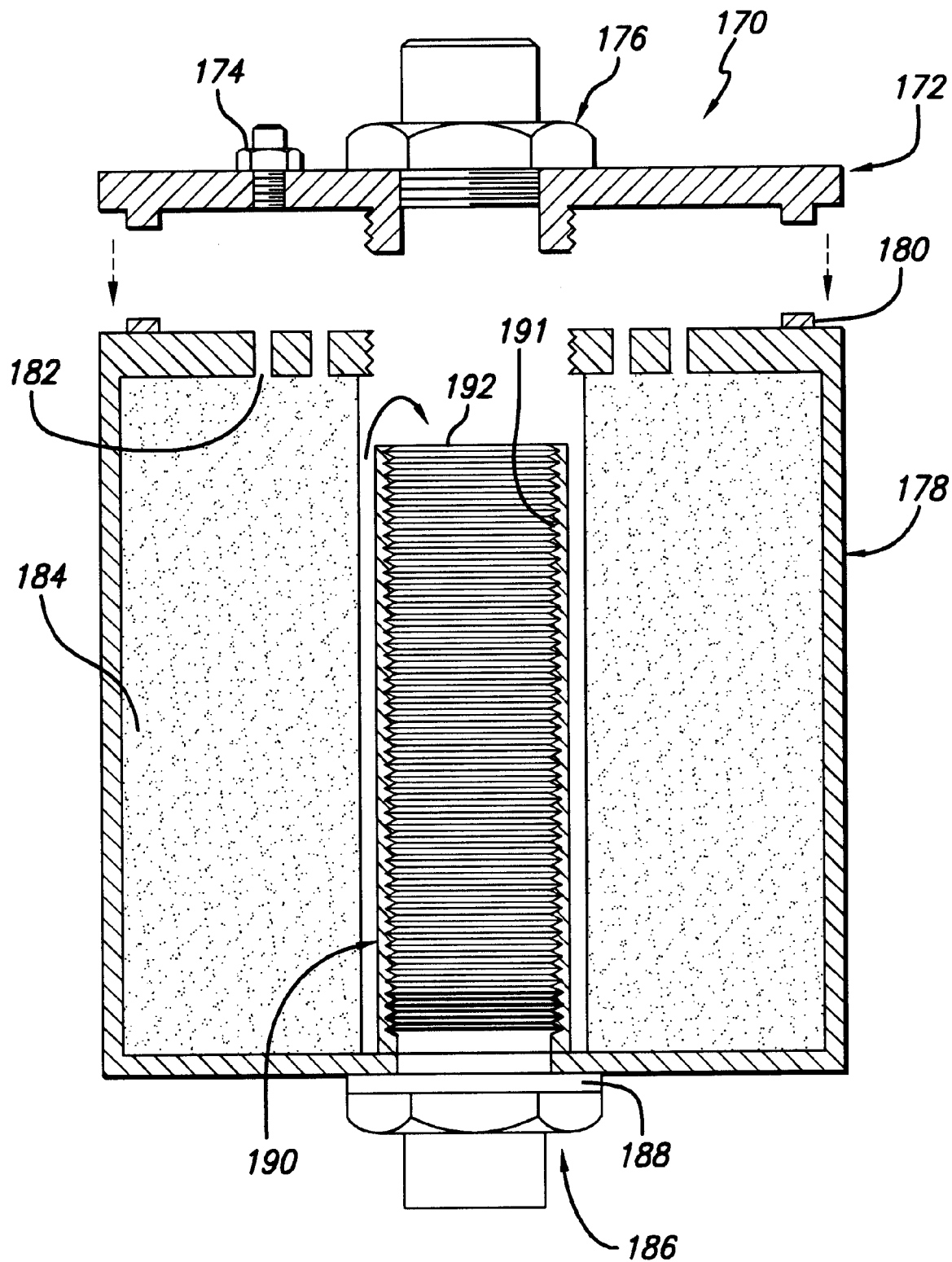
FIG. 7 is a cross-sectional view of a third alternative embodiment of the present invention.

FIG. 7 is a cross-sectional view of a third alternative embodiment 170 of the present invention. The oil recycling system 170 includes an end cap 172. The end cap 172 includes a pressure inlet 174 and an evaporation vent tube 176. The vent tube 176 is made large to minimize the amount of vapor pressure required to vent liquid contaminants. A filter housing 178 screws onto the end cap 172 that seals to the housing at a first oil-tight seal 180. The filter housing 178 has oil inlet passages 182 that feed pressurized oil from the oil inlet 174 to a low micron or sub-micron filtering media 184. An evaporation/drainage assembly 186 screws into the bottom of the filter housing 178 and forms a second oil-tight seal 188. The evaporation/drainage assembly 186 includes a threaded pipe 190 that extends into a center space partially surrounded by the filter media 184. Threads 191 of the pipe 190 provide a large evaporation surface for oil entering the pipe from the filter media 184.

Oil flows from the filter media 184 and over the top of the pipe 192. The oil then flows over the threads 191 where vaporized contaminants pass out the vent tube 176. The rate of oil flow through the oil recycling system 170 is controlled by a conventional flow control valve (not shown) connected to the oil inlet 174. The flow of oil is controlled so that a thin film flows over the threads 191 in the pipe 190. The depth of the film is on the order of the dimensions of the threads 191.

The end cap 172 may be constructed at an ordinary machine shop. All other components or parts may be purchased separately at a hardware store or filter supply house.

The novel design of the present invention is facilitated by the unique combination of the end cap 172 with the evaporation/drainage assembly 186 which are easily adaptable to existing filter housings.

Those skilled in the art will appreciate that a co-linear embodiment of the present invention may be implemented wherein the filter and evaporation surface are not concentric without departing from the scope of the present invention.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. An oil cleaning system comprising:

pressure means for changing a pressure of oil from a first pressure to a second pressure lower than said first pressure;

evaporation means for spreading said oil over a ridged surface at said second pressure to evaporate contaminants from said oil, said ridged surface having a plurality of dips or grooves for expanding the surface area of said ridged surface over that of a substantially flat surface and having perforations therethrough for facilitating the dispersion of oil at said second pressure on said ridged surface;

drainage means for draining oil from said oil cleaning system, said drainage means in fluid communication with said evaporation means and located at a lower portion of said oil cleaning system; and centrifuge means for swirling said oil to remove solid contaminants from circulation within said oil.

2. A compact system for cleaning a first fluid comprising:

first means for changing a surface area of a predetermined volume of said first fluid from a first area to a second area, said second area having a plurality of dips or grooves for expanding said area over that of a substantially flat area and having holes therethrough for allowing said first fluid to pass, said holes distributed in two dimensions over said second area;

second means for exposing a portion of said second area to a second fluid for removing contaminants from said first fluid, said second means including a tube having a grooved surface corresponding to said second area, said grooved surface having holes therein through which said first fluid passes, said first fluid exposed to said second fluid at said grooved surface, third means for draining said first fluid from said second area, said means for draining positioned on a bottom portion of said system and oriented for directing said oil immediately downward and out of said system; and vent means for communicating contaminants out of said system, said vent means extending through a top of an evaporation chamber of said second means, said top positioned opposite a bottom of said evaporation chamber, said third means including an outlet extending through said bottom of said evaporation chamber;

wherein said compact system includes an approximately cylindrical container having an inlet for directing said fluid into said container at a first pressure and a filter having an approximately cylindrical outer surface and a cylindrical inner surface disposed within said container, said filter sized and positioned within said container forming a space between an interior of said container and said cylindrical outer surface, said inlet in fluid communication with said space, said space allowing said first fluid to contact said cylindrical outer surface and pass radially or laterally through said filter and radially or laterally through and onto said second area and out of said compact system through said outlet; and wherein said inlet includes an orifice through a tube, said orifice and said tube oriented for directing oil out of said orifice tangential to said cylindrical outer surface in said space, thereby creating a centrifugal flow within said space for facilitating the removal of solid contaminants from said oil.

3. An oil cleaning system comprising:

a container having a tube disposed vertically therein, said tube having an inner wall;

means for filtering disposed within said container, said means for filtering including a first wall and said inner wall, said inner wall having a specially textured surface and defining a inner chamber, said first wall defining a first chamber, said specially textured surface having perforations therethrough, said means for filtering including a filter at least partially surrounding said tube and covering said perforations, means for directing said oil at a first pressure into said first chamber, said means for directing including an inlet opening into said first chamber, said inlet including an orifice in a side of a tube with a closed end, said orifice for shooting oil tangent to an outer surface of said filter to create a centrifugal flow in said first chamber for facilitating the removal of solid contaminants from said oil;

means for applying oil in said first chamber to said first wall so that said oil is filtered by said filter and flows through said inner wall and over said inner wall at a second pressure to allow fluid contaminants to evaporate or disperse within said inner chamber;

means for communicating evaporated or dispersed contaminants out of said inner chamber, said means for communicating including a check valve for preventing oil from exiting said system via said means for communicating while allowing said evaporated or dispersed contaminants to freely escape from said inner chamber, said means for communicating including a vent extending through an end cap of said housing opposite a base of said container, said vent opening into said inner chamber; and means for draining said oil from said inner chamber, said means for draining positioned at a bottom of said container opposite to said means for communicating, said means for draining including an outlet that extends through said base of said container, said outlet in fluid communication with said inner chamber; wherein said first chamber comprises an annular space between a wall of said container and said filter, said filter, said inlet, said outlet, said tube, and said means for communicating positioned so that oil input via said inlet enters a radially outer surface of said filter corresponding to said first wall, passes through said filter, through said perforations in said tube, flows down said specially textured surface in said inner chamber during which vapor or volatile materials evaporate, and flows out of said compact oil recycling system by gravity through said outlet.

* * * * *